(12) United States Patent
Li et al.

(10) Patent No.: US 10,674,315 B2
(45) Date of Patent: Jun. 2, 2020

(54) METHOD AND DEVICE FOR JUDGING INTERCITY TRANSPORTATION MODE BASED ON MOBILE PHONE DATA

(71) Applicants: SHANDONG PROVINCIAL COMMUNICATIONS PLANNING AND DESIGN INSTITUTE, Jinan, Shandong (CN); TSINGHUA UNIVERSITY, Beijing (CN)

(72) Inventors: Yong Li, Beijing (CN); Wei Liu, Jinan (CN); Zhen Tu, Beijing (CN); Weiling Wu, Jinan (CN); Li Su, Beijing (CN); Depeng Jin, Beijing (CN); Tao Mu, Jinan (CN); Qiyun Wei, Jinan (CN); Guohua Han, Jinan (CN); Chuanyi Ma, Jinan (CN); Pengfei Zhou, Jinan (CN); Kai Wang, Jinan (CN)

(73) Assignees: SHANDONG PROVINCIAL COMMUNICATIONS PLANNING AND DESIGN INSTITUTE, Jinan (CN); TSINGHUA UNIVERSITY, Beijing (CN)

( * ) Notice: Subject to any disclaimer, the term of this patent is extended or adjusted under 35 U.S.C. 154(b) by 0 days.

(21) Appl. No.: 16/321,064

(22) PCT Filed: Mar. 28, 2018

(86) PCT No.: PCT/CN2018/080948
§ 371 (c)(1),
(2) Date: Jan. 28, 2019

(87) PCT Pub. No.: WO2019/001045
PCT Pub. Date: Jan. 3, 2019

(65) Prior Publication Data
US 2019/0182624 A1    Jun. 13, 2019

(30) Foreign Application Priority Data

Jun. 30, 2017   (CN) .......................... 2017 1 0527016

(51) Int. Cl.
*H04W 4/02*     (2018.01)
*H04W 64/00*    (2009.01)
*H04M 1/725*    (2006.01)

(52) U.S. Cl.
CPC ....... *H04W 4/027* (2013.01); *H04M 1/72572* (2013.01); *H04W 64/006* (2013.01)

(58) Field of Classification Search
CPC .......... B64C 2201/145; G01C 21/3407; G01C 21/3492; G06Q 10/047; G06Q 50/30;
(Continued)

(56) References Cited

U.S. PATENT DOCUMENTS

| 2012/0221231 A1* | 8/2012 | Nagata | G08G 1/012 |
| | | | 701/118 |
| 2012/0221232 A1* | 8/2012 | Shang | G08G 1/012 |
| | | | 701/119 |

(Continued)

FOREIGN PATENT DOCUMENTS

| CN | 105183893 A | 12/2015 |
| CN | 106067154 A | 11/2016 |
| CN | 106448173 A | 2/2017 |
| CN | 107241512 A | 10/2017 |

OTHER PUBLICATIONS

Jun. 4, 2019 Office Action issued in Chinese Patent Application No. 201710527016.1.
(Continued)

*Primary Examiner* — Liton Miah
(74) *Attorney, Agent, or Firm* — Oliff PLC

(57) ABSTRACT

A method and device for judging intercity transportation modes based on mobile phone data solves the problems of difficult data acquisition and low data processing efficiency (Continued)

in the existing solutions. The method includes: obtaining the trajectory of each user from the mobile phone data; extracting an intercity traffic sub-trajectory in the trajectory of each user; and judging the transportation mode of the intercity traffic sub-trajectory. The solution has the advantages of easy data acquisition, high data processing efficiency and capability of achieving long-term monitoring.

7 Claims, 3 Drawing Sheets

(58) Field of Classification Search
CPC ....... G06F 16/29; H04W 4/029; H04W 4/027; H04W 4/40; H04W 4/02; H04W 4/38; H04W 64/006; H04L 67/22
See application file for complete search history.

(56) References Cited

U.S. PATENT DOCUMENTS

| | | |
|---|---|---|
| 2012/0296560 A1 | 11/2012 | Zheng et al. |
| 2015/0345978 A1* | 12/2015 | Igelman ............. G01C 21/3611 701/425 |
| 2016/0241993 A1* | 8/2016 | Bellens ................... G06Q 10/06 |
| 2017/0294139 A1* | 10/2017 | Cordova .............. G09B 19/167 |

OTHER PUBLICATIONS

Aug. 2, 2019 Decision to Grant issued in Chinese Patent Application No. 201710527016.1.
Jun. 8, 2018 Written Opinion issued in International Application No. PCT/CN2018/080948.
Jun. 30, 2017 International Search Report issued in PCT/CN2018/080948.

* cited by examiner ratio mode corresponding to the sub-trajectory $r_i$ is the flight travel;

METHOD AND DEVICE FOR JUDGING INTERCITY TRANSPORTATION MODE BASED ON MOBILE PHONE DATA

FIELD OF THE INVENTION

The present invention relates to communication technology/computer technology, and in particular to a method and device for judging an intercity transportation mode based on mobile phone data.

BACKGROUND OF THE INVENTION

Traffic survey is the basic work for traffic planning and the feasibility study of highways, railways, aviation and other construction projects, and is mainly to fully understand public travel characteristics in the area where the project is located, grasp the traffic volumes, origins and destinations, the model split and other data, and provide basic data for the prediction of the traffic volume or throughput so as to provide reference for the subsequent project construction and evaluation. In a comprehensive transportation system of China, various modes of transportation are managed by different departments. For a planning and design department, it is very difficult to obtain complete transportation statistics, and the data formats and statistical specifications of different modes of transportation are inconsistent and are difficult to aggregate for analysis. The traditional transportation mode survey adopts manual roadside inquiry, sample survey and other manners, which consume a lot of manpower and material resources, and has problems such as limited survey scope and time, low sampling rate and low data processing efficiency.

With the widespread use of mobile phones and the rapid development of the mobile positioning technology, analysis of mobile phone big data has become a new way to obtain transportation statistics. A mobile operator can judge a user's location in real time according to a base station connected with the mobile phone, and a smart phone can also be turned on the GPS positioning function to report its location to mobile phone softwares such as Baidu map. Therefore, a huge amount of users' time and location information can be obtained from the mobile operator and a mobile phone software operator, so that users' travel trajectory, moving speeds and other information can be obtained, and then the transportation mode estimated. Compared with traditional traffic survey technologies, the mobile phone data also has the advantages of wide coverage, large sample size, and capability of long-term continuous monitoring, thereby being able to provide more timely and accurate basic data and decision support for traffic planning and operation.

With the convenience of transportation and the acceleration of urbanization, connections among cities are getting closer and closer, especially between provincial capitals at the economic center positions and trade-prone coastal cities in the same province. Therefore, traffic survey in large inter-city areas is of great significance for transportation planning, operation and even economic development. The current methods either require the use of mobile phone GPS data, or the use of road network data. Although mobile phone GPS data has high positioning accuracy, it is difficult to obtain when users turn off GPS; the road network matching needs detailed road information, which is often difficult to obtain or is obtained incompletely, and requires a large amount of data processing and complex calculation.

Therefore, it is necessary for intercity transportation mode survey to provide a new method with relatively simple calculation and less difficult data acquisition.

SUMMARY OF THE INVENTION

In view of the above problems, the present invention provides a method and device for judging an intercity transportation mode based on mobile phone data for overcoming the above problems or at least partially solving the above problems.

To this end, a first aspect of the present invention provides a method for judging an intercity transportation mode based on mobile phone data, including:

obtaining trajectory of each user from the mobile phone data;

extracting an intercity traffic sub-trajectory in the trajectory of each user; and judging the transportation mode of the intercity traffic sub-trajectory.

Optionally, extracting the intercity traffic sub-trajectory in the trajectory of each user includes:

the trajectory data including m trajectories, marking the m trajectories as $S=\{s_1, s_2 \ldots s_m\}$, $s_i \in S$;

judging whether a city C3 and a city C4 corresponding to the sub-trajectory $s_i$ are adjacent, and if the city C3 and the city C4 are adjacent, adding the sub-trajectory $s_i$ to a sub-trajectory set R; and if the city C3 and the city C4 are not adjacent, judging whether the sub-trajectory $s_i$ is a sub-trajectory with a transit city, if the sub-trajectory has the transit city, correspondingly dividing the sub-trajectory $s_1$ into two segments of sub-trajectories according to the transit city, and adding the two segments of sub-trajectories to the sub-trajectory set R; if the sub-trajectory has no transit city, adding the sub-trajectory $s_i$ to the sub-trajectory set R; and processing all sub-trajectories in the sub-trajectory set R by using a method of processing the sub-trajectory $s_i$ until all sub-trajectories in the sub-trajectory set R do not include a transit city.

Optionally, judging the transportation mode of the intercity traffic sub-trajectory includes: S401 judging whether the sub-trajectory $r_i$ is a flight travel, S402 judging whether the sub-trajectory $r_i$ is a train travel, and S403 judging whether the sub-trajectory $r_i$ is a road transportation;

the step S401 of judging whether the sub-trajectory $r_i$ is the flight travel includes: if there is a flight between a city C5 and a city C6 corresponding to the sub-trajectory $r_i$, if the time of the sub-trajectory $r_i$ passing A1 or A2 exceeds an airport stay threshold, and at least the A1 or the A2 has no railway station or bus station, then the transportation mode corresponding to the sub-trajectory $r_i$ is the flight travel;

otherwise, judging whether the maximum speed and the average speed of the sub-trajectory $r_i$ is within a preset aircraft navigation speed range, if so, the transportation mode corresponding to the sub-trajectory $r_i$ is the flight travel;

the step S402 of judging whether the sub-trajectory $r_i$ is the train travel includes: if there is a train between the city C5 and the city C6 corresponding to the sub-trajectory $r_i$, the time of the sub-trajectory $r_i$ passing T1 and the time of the sub-trajectory $r_i$ passing T2 both exceed a railway station stay threshold, the maximum speed or the average speed of the sub-trajectory $r_i$ exceeds a preset motor vehicle speed range, and the time of the sub-trajectory $r_i$ passing the T1 or T2 meets a train number in a railway timetable, then the transportation mode corresponding to the sub-trajectory $r_i$ is the train travel;

if one of the time of the sub-trajectory $r_i$ passing the T1 and the time of the sub-trajectory $r_i$ passing the T2 exceeds the railway station stay threshold, and the maximum speed or the average speed of the sub-trajectory $r_i$ is within a preset first train speed range, wherein the lower boundary of the first train speed range exceeds the upper boundary of the motor vehicle speed range, and the difference value between the lower boundary of the first train speed range and the upper boundary of the motor vehicle speed range is greater than a speed difference preset value, then the transportation mode corresponding to the sub-trajectory $r_i$ is the train travel;

if one of the time of the sub-trajectory $r_i$ passing the T1 and the time of the sub-trajectory $r_i$ passing the T2 exceeds the railway station stay threshold, the maximum speed or the average speed of the sub-trajectory $r_i$ exceeds the preset motor vehicle speed range, and the difference value between the movement direction of the sub-trajectory $r_i$ within an outbound time after passing the T1 and the movement direction of the sub-trajectory $r_i$ within an inbound time before entering the T2 is smaller than a direction deviation preset value, then the transportation mode corresponding to the sub-trajectory $r_i$ is the train travel;

if neither of the time of the sub-trajectory $r_i$ passing the T1 and the time of the sub-trajectory $r_i$ passing the T2 exceeds the railway station stay threshold, and the maximum speed or the average speed of the sub-trajectory $r_i$ is within a preset second train speed range, then the transportation mode corresponding to the sub-trajectory $r_i$ is the train travel;

the step S403 of judging whether the sub-trajectory $r_i$ is the road transportation includes: if the sub-trajectory $r_i$ fails to be determined as the flight travel or the train travel according to S401 or S402, then the transportation mode corresponding to the sub-trajectory $r_i$ is the road transportation; and the sub-trajectory $r_i$ corresponds to the trajectory between the city C5 and the city C6, wherein A1 represents an airport area corresponding to the city C5, and A2 represents the airport area corresponding to the city C6; T1 represents a railway station area corresponding to the city C5, and T2 represents the railway station area corresponding to the city C6; and B1 represents a bus station area corresponding to the city C5, B2 represents the bus station area corresponding to the city C6, and the sub-trajectory $r_i \in R$.

Optionally, after the transportation mode corresponding to the sub-trajectory $r_i$ is determined as the train travel, the method further includes the following steps:

if the maximum speed or the average speed of the sub-trajectory $r_i$ is within a preset high-speed rail range, then the transportation mode corresponding to the sub-trajectory $r_i$ is high-speed rail travel, or otherwise, the transportation mode corresponding to the sub-trajectory $r_i$ is ordinary train travel.

Optionally, after the transportation mode corresponding to the sub-trajectory $r_i$ is determined as the road transportation, the method further includes the following steps:

if the sub-trajectory $r_i$ passes a highway toll station, or a highway entrance, exit or service area, and the average speed of the sub-trajectory $r_i$ is greater than or equal to 100 km/h, then the transportation mode corresponding to the sub-trajectory $r_i$ is highway travel; and if the sub-trajectory $r_i$ does not pass a highway toll station, or a highway entrance, exit or service area, and the average speed of the sub-trajectory $r_i$ is less than 100 km/h, then the transportation mode corresponding to the sub-trajectory $r_i$ is ordinary road travel.

Optionally, after the step S403 of judging whether the sub-trajectory $r_i$ is the road transportation, the method further includes the following steps:

if the transportation mode corresponding to the sub-trajectory $r_i$ fails to be determined, obtaining a corresponding pre-judgment base station sequence set according to the sub-trajectory $r_i$, separately obtaining corresponding typical base station sequence sets according to a typical aviation trajectory, a typical high-speed rail trajectory, a typical ordinary train trajectory and a typical highway trajectory, calculating the similarities between the pre-judgment base station sequence set and the typical base station sequence sets respectively, if one similarity S1 is greater than the other similarities, the difference value between the similarity S1 and the closest similarity S2 is greater than a preset similarity difference value, and the similarity is greater than a similarity threshold, then the transportation mode of the sub-trajectory $r_i$ is the same as the transportation mode corresponding to the base station sequence set for calculating the similarity.

Optionally, after the step S403 of judging whether the sub-trajectory $r_i$ is the road transportation, the method further includes the following steps:

if the transportation mode corresponding to the sub-trajectory $r_i$ fails to be determined, the transportation mode corresponding to the sub-trajectory $r_i$ is a transportation mode other than the flight travel, the train travel and the road transportation.

In a second aspect, the present invention provides a computer readable storage medium storing a computer program, wherein the program, when executed by a processor, implements the steps of any method described above.

In a third aspect, the present invention provides a computer readable storage medium storing a computer program, wherein the program, when executed by a processor, implements the steps of any method described above.

It can be seen from the above technical solutions that, due to the use of the mobile phone big data proposed by the present invention, the mobile phone signaling data collected and provided by the operator are used, so that the data acquisition cost is low. The mobile phone signaling data covers almost all intercity travelers, so the user coverage is high, and the intercity traffic data finally output after calculation is more trustworthy. The trajectory corresponding to the mobile phone signaling data is continuous and has a long time span and wide spatial coverage, therefore, in addition to studying the current transportation modes of people, it can also be used for studying the changes of the transportation modes of people. By adoption of the method herein, the identification of five intercity transportation modes is accomplished by feature extraction and classification under the assistance of matching key locations, and compared with the prior art, the calculation difficulty is small, and the calculation amount is small.

The foregoing description provides a brief summary for the understanding of some aspects of the present invention. This part is neither detailed nor exhaustive description of the present invention and the various embodiments thereof. It is not intended to identify important or critical features of the present invention, nor to limit the scope of the present invention, but provides the selected principles of the present invention in a simplified form as a brief introduction to the more detailed description given below. It should be understood that when one or more features illustrated above or specially described below are used alone or in combination, other embodiments of the present invention are also possible.

BRIEF DESCRIPTION OF THE DRAWINGS

To illustrate technical solutions in the embodiments of the present invention or in the prior art more clearly, a brief introduction on the accompanying drawings which are needed in the description of the embodiments or the prior art is given below. Apparently, the accompanying drawings in the description below are merely some of the embodiments of the present invention, based on which other accompanying drawings can be obtained by those of ordinary skill in the art without any creative effort.

DETAILED DESCRIPTION OF THE EMBODIMENTS

Figure 1:
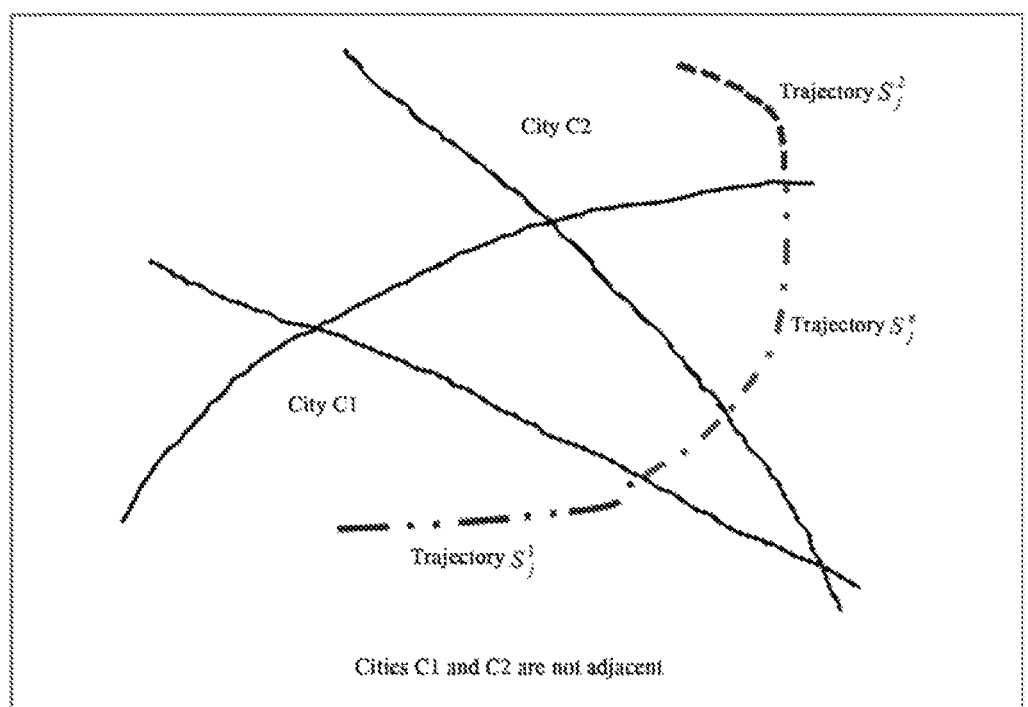
FIG. 1 is a schematic diagram of a trajectory with a transit city of the present invention.

The present invention will be described below in combination with exemplary embodiments.

The present invention provides a method of judging an intercity transportation mode based on mobile phone data, including:

S101 obtaining trajectory of each user from the mobile phone data;

S102 extracting an intercity traffic sub-trajectory in the trajectory of each user; and S103 judging the transportation mode of the intercity traffic sub-trajectory.

The trajectory data of the user means that when the user uses the phone card, a base station records the location of a phone card to generate the trajectory data. The users are distinguished according to the phone cards used by the users, and different phone numbers correspond to different trajectory data in the base station, that is, the space-time location of the mobile phone signaling data (user ID|connected timestamp| connected base station) is extracted, and continuous space-time location records form the trajectory of the user. The trajectory data are composed of a large number of trajectories. The trajectory means that the base station has the positioning data of the mobile phone after the mobile phone is connected with the base station, and the positioning data have spatial domain features, for example, the trajectory data of a user a and a user b can be respectively expressed as $Ta=\{(t_1^a, b_1^a), (t_2^a, b_2^a) \ldots (t_m^a, b_m^a)\}$, $Tb=\{(t_1^b, b_1^b), (t_2^b, b_2^b) \ldots (t_n^b, b_n^b)\}$, wherein $t_x^i$ represents a moment of collecting $(t_x^i, b_x^i)$, $b_x^i$ represents the location information of the mobile phone of the user at the moment $t_x^i$, and $t_x^i > t_{x+1}^i$. In some embodiments, the code of the base station of the mobile phone may be used for representing the location of the mobile phone, that is, $b_x^i$ may be a serial number of the base station or a coverage area of the base station or mobile network positioning of the mobile phone.

The implementation principle of the present invention will be described below by using an example that the $b_x^i$ is the serial number of the base station, those skilled in the art can make other changes and modifications to these embodiments once learning the basic inventive concepts disclosed herein, for example, the $b_x^i$ may be replaced by the coverage area of the base station or the mobile network positioning of the mobile phone so as to achieve the same effect.

According to the trajectory of the user, the intercity travel sub-trajectory is extracted to calculate the traffic mode between the two cities. In the method, the problem is gradually refined to solve the problem of judging the transportation mode between cities.

Optionally, extracting the intercity traffic sub-trajectory in the trajectory of each user includes:

the trajectory data including m trajectories, marking the m trajectories as $S=\{s_1, s_2 \ldots s_m\}$, $s_i \in S$; judging whether the trajectory $s_i$ of each user contain the coordinates of a city C1 and a city C2 at the same time one by one; wherein whether the trajectory of each user contain the coordinates of the city C1 and the city C2 can be judged one by one herein, and whether the trajectories of all users contain the coordinates of the city C1 and the city C2 can also be judged; in the embodiment, as the $b_x^i$ is the serial number of the base station, the coordinate of the city C1 and the coordinate of the city C2 respectively refer to the base station number of the city C1 and the base station number of the city C2;

if yes, the trajectory of the user contains a travel sub-trajectory from the city C1 to the city C2; the travel sub-trajectories with the same path are eliminated in the trajectory of the user; and all sub-trajectories of intercity traffic between adjacent cities constitute a sub-trajectory set R.

Optionally, extracting the intercity traffic sub-trajectory in the trajectory of each user includes:

the sub-trajectory $s_i, \in S=\{s_1, s_2, \ldots s_m\}$, judging whether a city C3 and a city C4 corresponding to the sub-trajectory $s_i$ are adjacent, and if the city C3 and the city C4 are adjacent, adding the sub-trajectory $s_i$ to a sub-trajectory set R, wherein the sub-trajectory in the sub-trajectory set R is a trajectory that generates no intercity transit;

if the city C3 and the city C4 are not adjacent, judging whether the sub-trajectory $s_i$ is a sub-trajectory with a transit city, wherein whether the sub-trajectory has the transit city can be judged by judging whether the sub-trajectory $s_i$ contains the coordinates of three or more different cities; it can be understood that the sub-trajectory $s_i$ includes a plurality of coordinates, and if no intercity transit is generated, the sub-trajectory $s_i$ only includes the coordinates of two different cities;

if the sub-trajectory has the transit city, correspondingly dividing the sub-trajectory $s_i$ into two segments of sub-trajectories according to the transit city, and adding the two segments of sub-trajectories to the sub-trajectory set R; if the sub-trajectory has no transit city, adding the sub-trajectory $s_i$ to the sub-trajectory set R; and processing all sub-trajectories in the sub-trajectory set R by using a method of processing the sub-trajectory $s_i$ until all sub-trajectories in the sub-trajectory set R do not include a transit city; and calculating the transportation modes of the sub-trajectories $s_i$ in the sub-trajectory set R one by one.

Since the base station has a large amount of trajectory data, after the above-mentioned decomposition of the trajectory of the user, the trajectories corresponding to all transportation modes between adjacent cities are obtained. It can be understood that, in other embodiments, the trajectories of each user can be counted one by one to obtain the data of intercity transportation modes, traffic mode usage frequencies and travel time periods, thereby providing more accurate data for the design of traffic routes.

In an embodiment of the present invention, the extracting sub-trajectory between two adjacent cities includes: when C1 and C2 are not adjacent, directly extracting the movement sub-trajectory of the user between the two cities, for example, the trajectory corresponding a piece of mobile phone signaling is that the user goes from the city C1 to the city C2, then sub-trajectory $s_j$ of the present intercity travel consists of three parts: a record $s_j^1$ within the last X hours before leaving the city C1+an intermediate trajectory $s_j^e$ of crossing other cities+a record $s_j^2$ within X hours after reaching the city C2, as shown in FIG. 1, and the sub-trajectories $s_j^1$, $s_j^e$ and $s_j^2$ are distinguished by different types of dashed lines in FIG. 1.

Figure 2:
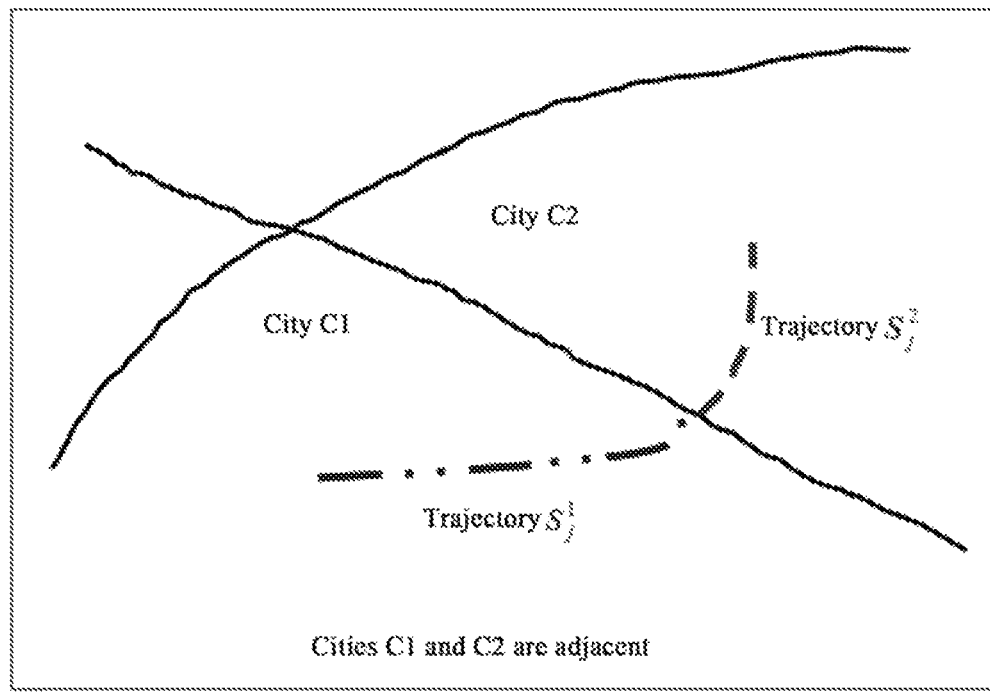
FIG. 2 is a schematic diagram of a trajectory without a transit city of the present invention.

When C1 and C2 are adjacent, there is an abnormal situation of switching back and forth between the two base stations due to the location at the junction between the two cities, the point (i.e., a jitter point) that is switched back and forth in the trajectory needs to be removed according to the feature "switching back and forth between base stations but the moving distance being small", and then the real movement sub-trajectory of the user between the two cities is extracted. At this time, the user goes from the city C1 to the city C2, and the sub-trajectory of the present intercity travel consists of two parts: a record $s_j^1$ within the last X hours before leaving the city C1+a record $s_j^2$ within X hours after reaching the city C2, as shown in FIG. 2. When the cities C1 and C2 are adjacent, only direct access is considered, since the distance is too small, there is usually no round-trip flight, therefore, only the two transportation modes, namely, the railway travel (which may be absent) and the road travel are considered, that is, it only needs to consider judging the transportation modes that provide the sub-trajectory $s_j$ (1, 2), $s_j$(1, 2) represents the sub-trajectory between C1 and C2, and it can be understood that there may be a plurality of sub-trajectories between C1 and C2, and $s_j$(1, 2) is just one of the sub-trajectories.

When C1 and C2 are not adjacent, when it is determined that the sub-trajectory $s_j$ contains a transit city CZ, we further divide the sub-trajectory into a sub-trajectory $s_j$ (C1, CZ) from C1 to CZ and a sub-trajectory $s_j$ (C2, CZ) from CZ to C2, and the transportation modes of the sub-trajectories $s_j$ (C1, CZ) and $s_j$ (C2, CZ) are respectively judged. Otherwise, we regard the sub-trajectory as direct access and directly judge the transportation mode of the sub-trajectory. For example, the trajectory corresponding to a piece of mobile phone signaling is $s_j$, $s_j$ is composed of a plurality of sub-trajectories with a transit time r (which may be zero), namely $s_j=[s_j^1(v_{11}, v_{12}), \ldots, s_j^{r+1}(v_{r+1,1}, v_{r+1,2})]$, wherein $v_{11}=C1$, $v_{r+1,2}=C2$ each sub-trajectory corresponds to a transportation mode, the $s_j$ corresponds to a transportation mode $w_j=[w_j^1(v_{11}, v_{12}), \ldots, w_j^{r+1}(v_{r+1,1}, v_{r+1,2})]$, and as the sub-trajectories of $s_j$ are arranged according to the time sequence, the $w_j$ also has a time sequence.

Figure 3:
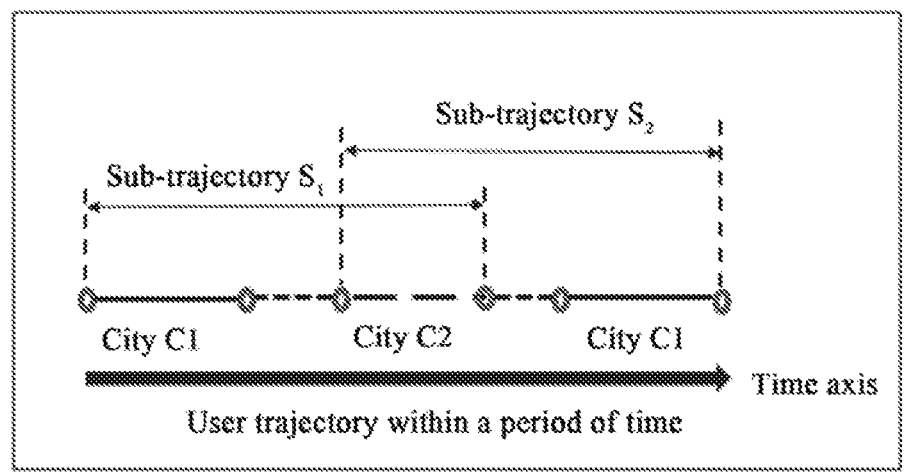
FIG. 3 is a schematic diagram of a trajectory of a user of the present invention, wherein the user is within a bordering area between a city C2 and a city C1 within a period of time.
Figure 4:
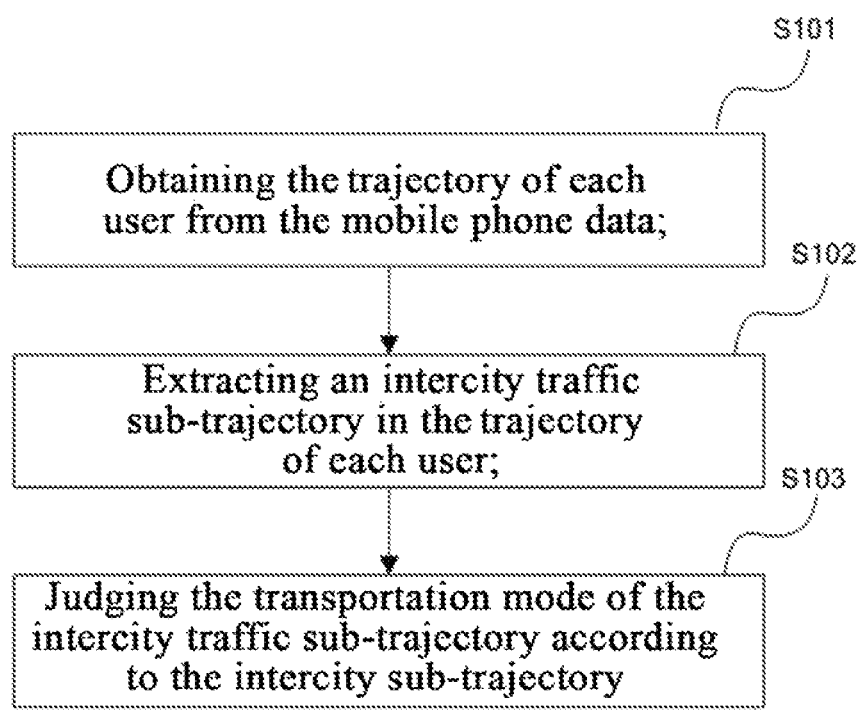
FIG. 4 is a schematic diagram of executing a method in one embodiment of the present invention.

As shown in FIG. 3, as the user trajectory $s_j$ may contain multiple round-trip records between two cities, we extract all sub-trajectories meeting the conditions to obtain a sub-trajectory set R of the adjacent intercity traffic.

In an embodiment of the present invention, judging the transportation mode of the sub-trajectory according to the sub-trajectory includes: calculating the transportation mode of the sub-trajectory $r_i$ in the sub-trajectory set R, including: S401 judging whether the sub-trajectory $r_i$ is a flight travel, S402 judging whether the sub-trajectory $r_i$ is a train travel, and S403 judging whether the sub-trajectory $r_i$ is a road transportation;

A1 represents an airport area corresponding to the city C5, and A2 represents the airport area corresponding to the city C6. T1 represents a railway station area corresponding to the city C5, and T2 represents the railway station area corresponding to the city C6. B1 represents a bus station area corresponding to the city C5, and B2 represents the bus station area corresponding to the city C6.

The step S401 of judging whether the sub-trajectory $r_i$ is the flight travel includes: if there is a flight between a city C5 and a city C6 corresponding to the sub-trajectory $r_i$, if the time of the sub-trajectory $r_i$ passing A1 or A2 exceeds an airport stay threshold, and at least the A1 or the A2 has no railway station or bus station, then the transportation mode corresponding to the sub-trajectory $r_i$ is the flight travel; as shown in table 1:

TABLE 1 part of the method for judging whether the transportation mode is the flight travel

| | A1 Stay | A2 Stay | A1 Unique function | A2 Unique function | Situation | Judgment condition | Judgment |
|---|---|---|---|---|---|---|---|
| 1 | ✓ | ✓ | ✓ | ✓ | | | Flight travel |
| 2 | | | ✓ | x | | | Flight travel |
| 3 | | | x | ✓ | | | Flight travel |
| 4 | | | x | x | | | Further judgment |
| 5 | ✓ | x | ✓ | — | | | Flight travel |
| 6 | | | x | — | | | Further judgment |
| 7 | x | ✓ | — | ✓ | | | Flight travel |
| 8 | | | — | x | | | Further judgment |
| 9 | x | x | — | — | | | Further judgment | otherwise, judging whether the maximum speed and the average speed of the sub-trajectory $r_i$ is within a preset aircraft navigation speed range, if so, the transportation mode corresponding to the sub-trajectory $r_i$ is the flight travel;

the step S402 of judging whether the sub-trajectory $r_i$ is the train travel includes: if there is a train between the city C5 and the city C6 corresponding to the sub-trajectory $r_i$, the time of the sub-trajectory $r_i$ passing T1 and the time of the sub-trajectory $r_i$ passing T2 both exceed a railway station stay threshold, the maximum speed or the average speed of the sub-trajectory $r_i$ exceeds a preset motor vehicle speed range, and the time of the sub-trajectory $r_i$ passing the T1 or T2 meets a train number in a railway timetable, then the transportation mode corresponding to the sub-trajectory $r_i$ is the train travel;

if one of the time of the sub-trajectory $r_i$ passing the T1 and the time of the sub-trajectory $r_i$ passing the T2 exceeds the railway station stay threshold, and the maximum speed or the average speed of the sub-trajectory $r_i$ is within a preset first train speed range, wherein the lower boundary of the first train speed range exceeds the upper boundary of the motor vehicle speed range, and the difference value between the lower boundary of the first train speed range and the upper boundary of the motor vehicle speed range is greater than a speed difference preset value, then the transportation mode corresponding to the sub-trajectory $r_i$ is the train travel;

if one of the time of the sub-trajectory $r_i$ passing the T1 and the time of the sub-trajectory $r_i$ passing the T2 exceeds the railway station stay threshold, the maximum speed or the average speed of the sub-trajectory $r_i$ exceeds the preset motor vehicle speed range, and the difference value between the movement direction of the sub-trajectory $r_i$ within an outbound time after passing the T1 and the movement direction of the sub-trajectory $r_i$ within an inbound time before entering the T2 is smaller than a direction deviation preset value, then the transportation mode corresponding to the sub-trajectory $r_i$ is the train travel;

if neither of the time of the sub-trajectory $r_i$ passing the T1 and the time of the sub-trajectory $r_i$ passing the T2 exceeds the railway station stay threshold, and the maximum speed or the average speed of the sub-trajectory $r_i$ is within a preset second train speed range, then the transportation mode corresponding to the sub-trajectory $r_i$ is the train travel;

the step S403 of judging whether the sub-trajectory $r_i$ is the road transportation includes: if the sub-trajectory $r_i$ fails to be determined as the flight travel or the train travel according to S401 or S402, then the transportation mode corresponding to the sub-trajectory $r_i$ is the road transportation; and the sub-trajectory $r_i$ corresponds to the trajectory between the city C5 and the city C6.

Optionally, after the transportation mode corresponding to the sub-trajectory $r_i$ is the train travel, the method further includes the following steps:

if the maximum speed or the average speed of the sub-trajectory $r_i$ is within a preset high-speed rail range, then the transportation mode corresponding to the sub-trajectory $r_i$ is high-speed rail travel, or otherwise, the transportation mode corresponding to the sub-trajectory $r_i$ is ordinary train travel.

Optionally, after the transportation mode corresponding to the sub-trajectory $r_i$ is the road transportation, the method further includes the following steps:

if the sub-trajectory $r_i$ passes a highway toll station, or a highway entrance, exit or service area, and the average speed of the sub-trajectory $r_i$ is greater than or equal to 100 km/h, then the transportation mode corresponding to the sub-trajectory $r_i$ is highway travel; and if the sub-trajectory $r_i$ does not pass a highway toll station, or a highway entrance, exit or service area, and the average speed of the sub-trajectory $r_i$ is less than 100 km/h, then the transportation mode corresponding to the sub-trajectory $r_i$ is ordinary road travel. As shown in table 2:

TABLE 2 judgment of the road transportation mode

| | Judgment feature | | |
|---|---|---|---|
| Situation classification | The average speed is not less than 100 km/h | Matching the highway toll station, or a highway entrance, exit or service area | Judgment result |
| 1 | ✓ | ✓ | Highway travel |
| 2 | x | x | Ordinary road travel |
| 3 | ✓ | x | Further judgment |

Optionally, after the step S403 of judging whether the sub-trajectory $r_i$ is the road transportation, the method further includes the following steps:

if the transportation mode corresponding to the sub-trajectory $r_i$ fails to be determined, obtaining a corresponding pre-judgment base station sequence set according to the sub-trajectory $r_i$, separately obtaining corresponding typical base station sequence sets according to a typical aviation trajectory, a typical high-speed rail trajectory, a typical ordinary train trajectory and a typical highway trajectory, calculating the similarities between the pre-judgment base station sequence set and the typical base station sequence sets respectively, if one similarity S1 is greater than the other similarities, the difference value between the similarity S1 and the closest similarity S2 is greater than a preset similarity difference value, and the similarity is greater than a similarity threshold, then the transportation mode of the sub-trajectory $r_i$ is the same as the transportation mode corresponding to the base station sequence set for calculating the similarity. That is to say, for the above sub-trajectory in which the transportation mode (excluding the ordinary national and provincial roads) fails to be determined, we will select the typical trajectories of four transportation modes, namely, flight travel, the high-speed rail travel, the ordinary train travel and the highway travel, to calculate the similarity between the sub-trajectory and the base station sequence of the typical user. There are two ways of calculating the similarity: method 1) according to the base station sequences arranged according to a time sequence in the trajectory, constituting a base station pair having no sequential relationship by two adjacent base stations in the base station sequence, constituting a set by all base station pairs of the trajectory, and calculating F1-Score (F1 score) between the sets corresponding to the sub-trajectory $r_i$ and the typical trajectory respectively, wherein F1-Score is the similarity between the sub-trajectory $r_i$ and the typical trajectory; and method 2) according to the base station sequences arranged according to a time sequence in the trajectory, constituting a base station pair having sequential relationship by two adjacent base stations in the base station sequence, constituting a set by all base station pairs of the trajectory, wherein the base station pairs can be seen as two character strings, and calculating the Edit Distance and the similarity between the sets corresponding to the sub-trajectory $r_i$ and the typical trajectory respectively, wherein the value ranges are both between 0-1. If the similarity of the Y types of trajectories is higher that of the others, the transportation mode is determined as the Y type. Once the similarity of the travel trajectories is all very low (for example, all below 0.2), it is deemed that the transportation mode fails to be determined, the transportation mode is determined as "other" transportation modes, and the next step is executed. The "other" transportation modes refer to transportation modes other than the flight travel, the train travel and the road transportation.

Due to the use of the mobile phone big data proposed by the present invention, the mobile phone signaling data collected and provided by the operator are used, so that the data acquisition cost is low. The mobile phone signaling data covers almost all intercity travellers, so the user coverage is high, and the intercity traffic data finally output after calculation is more trustworthy. The trajectory corresponding to the mobile phone signaling data is continuous and has a long time span and wide spatial coverage, therefore, in addition to studying the current transportation modes of people, it can also be used for studying the changes of the transportation modes of people. By adoption of the method herein, the identification of five intercity transportation modes is accomplished by feature extraction and classification under the assistance of matching key locations, and compared with the prior art, the calculation difficulty is small, and the calculation amount is small.

In a second aspect, the present invention provides a computer readable storage medium storing a computer program, wherein the program, when executed by a processor, implements the steps of any method described above.

In a third aspect, the present invention provides a computer device, including a memory, a processor and a computer program stored on the memory executable on the processor, wherein the processor implements the steps of any method described above when executing the program.

As used herein, "at least one", "one or more", and "and/or" are open expressions that can be used in combination or separately. For example, "at least one of A, B, and C", "at least one of A, B, or C", "one or more of A, B, and C" and "one or more of A, B, or C," means only A exists, only B exists, only C exists, A and B exist together, A and C exist together, B and C exist together or A, B and C exist together.

The term "a/an" entity refers to one or more said entities. The terms "a", "one or more" and "at least one" can be used interchangeably herein. It should also be noted that the terms "include", "comprise" and "have" can also be used interchangeably.

The term "automatic" and variations thereof as used herein refer to any processing or operation that is performed without substantial human input when the processing or operation is executed. However, even if substantial or insubstantial human input received prior to the execution of the processing or operation is used during the execution of the processing or operation, the processing or operation can also be automatic. If the input affects how the processing or operation will be executed, then it is deemed that the human input is substantial. The human input that does not affect the processing or operation is not considered to be substantial.

The term "computer readable medium" as used herein refers to any tangible storage device and/or transmission medium that is involved in providing an instruction to the processor for execution. The computer readable medium can be a serial instruction set encoded in network transmission (e.g., SOAP) over an IP network. Such a medium may take many forms, including, but not limited to, a non-volatile medium, a volatile medium and a transmission medium. The non-volatile medium includes, for example, an NVRAM or a magnetic or optical disk. The volatile medium includes a dynamic memory (e.g., RAN) such as a main memory. The common forms of the computer readable medium include, for example, a floppy disk, a flexible disk, a hard disk, a magnetic tape or any other magnetic media, a magneto-optical medium, a CD-ROM, any other optical media, a perforated card, a paper tape, any other physical media having perforated patterns, an RAM, a PROM, an EPROM, a FLASH-EPROM, a solid state medium such as a memory card, any other memory chips or tape cartridges, a carrier described later, or any other media that can be read by a computer. Digital file attachments or other self-contained information files or file sets of emails are considered as distribution media equivalent to the tangible storage media. When the computer readable medium is configured as a database, it should be understood that the database can be any type of database, such as a relational database, a hierarchical database, an object oriented database, or the like. Accordingly, the present invention is considered to include a tangible storage medium or a distribution medium and equivalents well known in the art, and a medium developed in the future, and the software implementation of the present invention is stored in these media.

The terms "determining," "operating", and "calculating", and variations thereof used herein can be used interchangeably and include any type of method, processing, mathematical operation, or technique. More specifically, such terms may include an interpretation rule or a rule language such as BPEL, wherein the logic is not hard coded but represented in a rule file that can be read, interpreted, compiled and executed.

The term "module" or "tool" as used herein refers to any known or to-be-developed-later hardware, software, firmware, artificial intelligence, fuzzy logic, or a combination of hardware and software capable of performing the functions associated with the component. In addition, although the present invention has been described by using the exemplary embodiments, it should be understood that various aspects of the present invention may be protected separately.

It needs to be noted that, as used herein, relational terms such as first and second and the like are used merely for distinguishing one entity or operation from another entity or operation, and do not necessarily require or imply that these entities or operations have any such actual relationship or sequence. Furthermore, the terms "comprise," "include," or any other variations are intended to cover nonexclusive inclusion, so that a process, a method, an article, or a terminal device including a series of elements not only includes those elements, but also includes other elements that are not listed explicitly, or further includes inherent elements of the process, the method, the article or the terminal device. In the absence of more limitations, the element defined by the phrase "comprise" or "include" does not exclude the presence of additional elements in the process, the method, the article, or the terminal device that includes the element. In addition, as used herein, "greater than", "less than", "exceeding" and the like are understood as not including the present number; and "above", "below", "within" and the like are understood to include the number.

Although the above embodiments have been described, those skilled in the art can make additional changes and modifications to these embodiments once learning the basic inventive concepts, Thus, described above are merely embodiments of the present invention, and the protection scope of the present invention is not limited thereto. Any equivalent structural or equivalent process transformations made by using the contents of the specification and the drawings of the present invention, or direct or indirect applications in other related technical fields, are similarly included in the patent protection scope of the present invention.

The invention claimed is:

1. A method for judging intercity transportation modes based on mobile phone data, the method comprising:
   obtaining a trajectory of each user from the mobile phone data such that m trajectories are obtained and being represented as:

$S=\{s_1, s_2 \ldots s_m\}, S_i \in S;$ extracting an intercity traffic sub-trajectory in the trajectory of each user including:
      judging whether a city C3 and a city C4 corresponding to the sub-trajectory $s_i$ are adjacent,
      if the city C3 and the city C4 are adjacent, adding the sub-trajectory $s_i$ to a sub-trajectory set R, and
      if the city C3 and the city C4 are not adjacent, judging whether the sub-trajectory $s_i$ is a sub-trajectory with a transit city,
      if the sub-trajectory has the transit city, correspondingly dividing the sub-trajectory $s_i$ into two segments of sub-trajectories according to the transit city, and adding the two segments of sub-trajectories to the sub-trajectory set R,
      if the sub-trajectory has no transit city, adding the sub-trajectory $s_i$ to the sub-trajectory set R, and processing all sub-trajectories in the sub-trajectory set R based on a method of processing the sub-trajectory $s_i$ until all sub-trajectories in the sub-trajectory set R do not include a transit city; and judging the transportation mode of the intercity traffic sub-trajectory as being a flight travel, a train travel, or a road transportation, wherein:

the sub-trajectory $r_i$ is judged as being the flight travel based on:
if there is a flight between a city C5 and a city C6 corresponding to the sub-trajectory $r_i$, if the time of the sub-trajectory $r_i$ passing A1 or A2 exceeds an airport stay threshold, and at least the A1 or the A2 has no railway station or bus station, the transportation mode corresponding to the sub-trajectory $r_i$ is the flight travel, or if the maximum speed and the average speed of the sub-trajectory $r_i$ is within a preset aircraft navigation speed range, the transportation mode corresponding to the sub-trajectory $r_i$ is the flight travel;

the sub-trajectory $r_i$ is judged as being the train travel based on:
if there is a train between the city C5 and the city C6 corresponding to the sub-trajectory $r_i$, the time of the sub-trajectory $r_i$ passing T1 and the time of the sub-trajectory $r_i$ passing T2 both exceed a railway station stay threshold, the maximum speed or the average speed of the sub-trajectory $r_i$ exceeds a preset motor vehicle speed range, and the time of the sub-trajectory $r_i$ passing the T1 or T2 meets a train number in a railway timetable, the transportation mode corresponding to the sub-trajectory $r_i$ is the train travel, if one of the time of the sub-trajectory $r_i$ passing the T1 and the time of the sub-trajectory $r_i$ passing the T2 exceeds the railway station stay threshold, and the maximum speed or the average speed of the sub-trajectory $r_i$ is within a preset first train speed range, wherein the lower boundary of the first train speed range exceeds the upper boundary of the motor vehicle speed range, and the difference value between the lower boundary of the first train speed range and the upper boundary of the motor vehicle speed range is greater than a speed difference preset value, the transportation mode corresponding to the sub-trajectory $r_i$ is the train travel, if one of the time of the sub-trajectory $r_i$ passing the T1 and the time of the sub-trajectory $r_i$ passing the T2 exceeds the railway station stay threshold, the maximum speed or the average speed of the sub-trajectory $r_i$ exceeds the preset motor vehicle speed range, and the difference value between the movement direction of the sub-trajectory $r_i$ within an outbound time after passing the T1 and the movement direction of the sub-trajectory $r_i$ within an inbound time before entering the T2 is smaller than a direction deviation preset value, the transportation mode corresponding to the sub-trajectory $r_i$ is the train travel, or if neither of the time of the sub-trajectory $r_i$ passing the T1 and the time of the sub-trajectory $r_i$ passing the T2 exceeds the railway station stay threshold, and the maximum speed or the average speed of the sub-trajectory $r_i$ is within a preset second train speed range, then the transportation mode corresponding to the sub-trajectory $r_i$ is the train travel; and if the sub-trajectory $r_i$ fails to be determined as the flight travel or the train travel, the sub-trajectory $r_i$ is judged as being the road transportation, the sub-trajectory $r_i$ corresponds to the trajectory between the city C5 and the city C6; and A1 represents an airport area corresponding to the city C5, A2 represents the airport area corresponding to the city C6, T1 represents a railway station area corresponding to the city C5, T2 represents the railway station area corresponding to the city C6, B1 represents a bus station area corresponding to the city C5, and B2 represents the bus station area corresponding to the city C6, the sub-trajectory $r_i \in R$.

2. The method according to claim 1, wherein
after the transportation mode corresponding to the sub-trajectory $r_i$ is the train travel, the method further comprises the following steps:
if the maximum speed or the average speed of the sub-trajectory $r_i$ is within a preset high-speed rail range, then the transportation mode corresponding to the sub-trajectory $r_i$ is high-speed rail travel, or otherwise, the transportation mode corresponding to the sub-trajectory $r_i$ is ordinary train travel.

3. The method according to claim 1, wherein
after the transportation mode corresponding to the sub-trajectory $r_i$ is the road transportation, the method further comprises the following steps:
if the sub-trajectory $r_i$ passes a highway toll station, or a highway entrance, exit or service area, and the average speed of the sub-trajectory $r_i$ is greater than or equal to 100 km/h, then the transportation mode corresponding to the sub-trajectory $r_i$ is highway travel; and if the sub-trajectory $r_i$ does not pass a highway toll station, or a highway entrance, exit or service area, and the average speed of the sub-trajectory $r_i$ is less than 100 km/h, then the transportation mode corresponding to the sub-trajectory $r_i$ is ordinary road travel.

4. The method according to claim 1, wherein
after the step of judging whether the sub-trajectory $r_i$ is the road transportation, the method further comprises the following steps:
if the transportation mode corresponding to the sub-trajectory $r_i$ fails to be determined, obtaining a corresponding pre-judgment base station sequence set according to the sub-trajectory $r_i$, separately obtaining corresponding typical base station sequence sets according to a typical aviation trajectory, a typical high-speed rail trajectory, a typical ordinary train trajectory and a typical highway trajectory, calculating the similarities between the pre-judgment base station sequence set and the typical base station sequence sets respectively, if one similarity S1 is greater than the other similarities, the difference value between the similarity S1 and the closest similarity S2 is greater than a preset similarity difference value, and the similarity is greater than a similarity threshold, then the transportation mode of the sub-trajectory $r_i$ is the same as the transportation mode corresponding to the base station sequence set for calculating the similarity.

5. The method according to claim 1, wherein
after the step of judging whether the sub-trajectory $r_i$ is the road transportation, the method further comprises the following steps:
if the transportation mode corresponding to the sub-trajectory $r_i$ fails to be determined, the transportation mode corresponding to the sub-trajectory $r_i$ is a transportation mode other than the flight travel, the train travel and the road transportation.

6. A non-transitory computer readable storage medium storing a computer program that causes a processor to perform steps comprising:

obtaining a trajectory of each user from the mobile phone data such that m trajectories are obtained and being represented as:

$$S=\{s_1,s_2 \ldots s_m\}, s_i \in S;$$

extracting an intercity traffic sub-trajectory in the trajectory of each user including:
  judging whether a city C3 and a city C4 corresponding to the sub-trajectory $s_i$ are adjacent,
  if the city C3 and the city C4 are adjacent, adding the sub-trajectory $s_i$ to a sub-trajectory set R, and
  if the city C3 and the city C4 are not adjacent, judging whether the sub-trajectory $s_i$ is a sub-trajectory with a transit city,
  if the sub-trajectory has the transit city, correspondingly dividing the sub-trajectory $s_i$ into two segments of sub-trajectories according to the transit city, and adding the two segments of sub-trajectories to the sub-trajectory set R,
  if the sub-trajectory has no transit city, adding the sub-trajectory $s_i$ to the sub-trajectory set R, and
  processing all sub-trajectories in the sub-trajectory set R based on a method of processing the sub-trajectory $s_i$ until all sub-trajectories in the sub-trajectory set R do not include a transit city; and
judging the transportation mode of the intercity traffic sub-trajectory as being a flight travel, a train travel, or a road transportation, wherein:
the sub-trajectory $r_i$ is judged as being the flight travel based on:
  if there is a flight between a city C5 and a city C6 corresponding to the sub-trajectory $r_i$, if the time of the sub-trajectory $r_i$ passing A1 or A2 exceeds an airport stay threshold, and at least the A1 or the A2 has no railway station or bus station, the transportation mode corresponding to the sub-trajectory $r_i$ is the flight travel, or
  if the maximum speed and the average speed of the sub-trajectory $r_i$ is within a preset aircraft navigation speed range, the transportation mode corresponding to the sub-trajectory $r_i$ is the flight travel;
the sub-trajectory $r_i$ is judged as being the train travel based on:
  if there is a train between the city C5 and the city C6 corresponding to the sub-trajectory $r_i$, the time of the sub-trajectory $r_i$ passing T1 and the time of the sub-trajectory $r_i$ passing T2 both exceed a railway station stay threshold, the maximum speed or the average speed of the sub-trajectory $r_i$ exceeds a preset motor vehicle speed range, and the time of the sub-trajectory $r_i$ passing the T1 or T2 meets a train number in a railway timetable, the transportation mode corresponding to the sub-trajectory $r_i$ is the train travel,
  if one of the time of the sub-trajectory $r_i$ passing the T1 and the time of the sub-trajectory $r_i$ passing the T2 exceeds the railway station stay threshold, and the maximum speed or the average speed of the sub-trajectory $r_i$ is within a preset first train speed range, wherein the lower boundary of the first train speed range exceeds the upper boundary of the motor vehicle speed range, and the difference value between the lower boundary of the first train speed range and the upper boundary of the motor vehicle speed range is greater than a speed difference preset value, the transportation mode corresponding to the sub-trajectory $r_i$ is the train travel,
  if one of the time of the sub-trajectory $r_i$ passing the T1 and the time of the sub-trajectory $r_i$ passing the T2 exceeds the railway station stay threshold, the maximum speed or the average speed of the sub-trajectory $r_i$ exceeds the preset motor vehicle speed range, and the difference value between the movement direction of the sub-trajectory $r_i$ within an outbound time after passing the T1 and the movement direction of the sub-trajectory $r_i$ within an inbound time before entering the T2 is smaller than a direction deviation preset value, the transportation mode corresponding to the sub-trajectory $r_i$ is the train travel, or
  if neither of the time of the sub-trajectory $r_i$ passing the T1 and the time of the sub-trajectory $r_i$ passing the T2 exceeds the railway station stay threshold, and the maximum speed or the average speed of the sub-trajectory $r_i$ is within a preset second train speed range, then the transportation mode corresponding to the sub-trajectory $r_i$ is the train travel; and
if the sub-trajectory $r_i$ fails to be determined as the flight travel or the train travel, the sub-trajectory $r_i$ is judged as being the road transportation, the sub-trajectory $r_i$ corresponds to the trajectory between the city C5 and the city C6; and
A1 represents an airport area corresponding to the city C5, A2 represents the airport area corresponding to the city C6, T1 represents a railway station area corresponding to the city C5, T2 represents the railway station area corresponding to the city C6, B1 represents a bus station area corresponding to the city C5, and B2 represents the bus station area corresponding to the city C6, the sub-trajectory $r_i \in R$.

7. A computer device, comprising:
a processor programmed to:
  obtaining a trajectory of each user from the mobile phone data such that m trajectories are obtained and being represented as:

$$S=\{s_1,s_2 \ldots s_m\}, s_i \in S;$$

extracting an intercity traffic sub-trajectory in the trajectory of each user including:
    judging whether a city C3 and a city C4 corresponding to the sub-trajectory $s_i$ are adjacent,
    if the city C3 and the city C4 are adjacent, adding the sub-trajectory $s_i$ to a sub-trajectory set R, and
    if the city C3 and the city C4 are not adjacent, judging whether the sub-trajectory $s_i$ is a sub-trajectory with a transit city,
    if the sub-trajectory has the transit city, correspondingly dividing the sub-trajectory $s_i$ into two segments of sub-trajectories according to the transit city, and adding the two segments of sub-trajectories to the sub-trajectory set R,
    if the sub-trajectory has no transit city, adding the sub-trajectory $s_i$ to the sub-trajectory set R, and
    processing all sub-trajectories in the sub-trajectory set R based on a method of processing the sub-trajectory $s_i$ until all sub-trajectories in the sub-trajectory set R do not include a transit city; and
  judging the transportation mode of the intercity traffic sub-trajectory as being a flight travel, a train travel, or a road transportation, wherein:

the sub-trajectory $r_i$ is judged as being the flight travel based on:
- if there is a flight between a city C5 and a city C6 corresponding to the sub-trajectory $r_i$, if the time of the sub-trajectory $r_i$ passing A1 or A2 exceeds an airport stay threshold, and at least the A1 or the A2 has no railway station or bus station, the transportation mode corresponding to the sub-trajectory $r_i$ is the flight travel, or
- if the maximum speed and the average speed of the sub-trajectory $r_i$ is within a preset aircraft navigation speed range, the transportation mode corresponding to the sub-trajectory $r_i$ is the flight travel;

the sub-trajectory $r_i$ is judged as being the train travel based on:
- if there is a train between the city C5 and the city C6 corresponding to the sub-trajectory $r_i$, the time of the sub-trajectory $r_i$ passing T1 and the time of the sub-trajectory $r_i$ passing T2 both exceed a railway station stay threshold, the maximum speed or the average speed of the sub-trajectory $r_i$ exceeds a preset motor vehicle speed range, and the time of the sub-trajectory $r_i$ passing the T1 or T2 meets a train number in a railway timetable, the transportation mode corresponding to the sub-trajectory $r_i$ is the train travel,
- if one of the time of the sub-trajectory $r_i$ passing the T1 and the time of the sub-trajectory $r_i$ passing the T2 exceeds the railway station stay threshold, and the maximum speed or the average speed of the sub-trajectory $r_i$ is within a preset first train speed range, wherein the lower boundary of the first train speed range exceeds the upper boundary of the motor vehicle speed range, and the difference value between the lower boundary of the first train speed range and the upper boundary of the motor vehicle speed range is greater than a speed difference preset value, the transportation mode corresponding to the sub-trajectory $r_i$ is the train travel,
- if one of the time of the sub-trajectory $r_i$ passing the T1 and the time of the sub-trajectory $r_i$ passing the T2 exceeds the railway station stay threshold, the maximum speed or the average speed of the sub-trajectory $r_i$ exceeds the preset motor vehicle speed range, and the difference value between the movement direction of the sub-trajectory $r_i$ within an outbound time after passing the T1 and the movement direction of the sub-trajectory $r_i$ within an inbound time before entering the T2 is smaller than a direction deviation preset value, the transportation mode corresponding to the sub-trajectory $r_i$ is the train travel, or
- if neither of the time of the sub-trajectory $r_i$ passing the T1 and the time of the sub-trajectory $r_i$ passing the T2 exceeds the railway station stay threshold, and the maximum speed or the average speed of the sub-trajectory $r_i$ is within a preset second train speed range, then the transportation mode corresponding to the sub-trajectory $r_i$ is the train travel; and if the sub-trajectory $r_i$ fails to be determined as the flight travel or the train travel, the sub-trajectory $r_i$ is judged as being the road transportation, the sub-trajectory $r_i$ corresponds to the trajectory between the city C5 and the city C6; and A1 represents an airport area corresponding to the city C5, A2 represents the airport area corresponding to the city C6, T1 represents a railway station area corresponding to the city C5, T2 represents the railway station area corresponding to the city C6, B1 represents a bus station area corresponding to the city C5, and B2 represents the bus station area corresponding to the city C6, the sub-trajectory $r_i \in R$.

* * * * *